US012413916B2

(12) United States Patent
Mirbagheri et al.

(10) Patent No.: US 12,413,916 B2
(45) Date of Patent: Sep. 9, 2025

(54) APPARATUS AND METHOD FOR SPEECH ENHANCEMENT AND FEEDBACK CANCELLATION USING A NEURAL NETWORK

(71) Applicant: Starkey Laboratories, Inc., Eden Prairie, MN (US)

(72) Inventors: Majid Mirbagheri, Seattle, WA (US); Henning Schepker, Oldenburg (DE)

(73) Assignee: Starkey Laboratories, Inc., Eden Prairie, MN (US)

( * ) Notice: Subject to any disclaimer, the term of this patent is extended or adjusted under 35 U.S.C. 154(b) by 365 days.

(21) Appl. No.: 18/119,357

(22) Filed: Mar. 9, 2023

(65) Prior Publication Data

US 2023/0292063 A1 Sep. 14, 2023

Related U.S. Application Data

(60) Provisional application No. 63/330,396, filed on Apr. 13, 2022, provisional application No. 63/318,069, filed on Mar. 9, 2022.

(51) Int. Cl.
*H04R 25/00* (2006.01)
*G10L 21/02* (2013.01)

(52) U.S. Cl.
CPC ............ *H04R 25/507* (2013.01); *G10L 21/02* (2013.01); *H04R 2225/43* (2013.01)

(58) Field of Classification Search
CPC ............... H04R 25/505; H04R 25/507; H04R 2225/41; H04R 2225/43; H04R 2460/01
See application file for complete search history.

(56) References Cited

U.S. PATENT DOCUMENTS

| | | | |
|---|---|---|---|
| 6,377,682 | B1 | 4/2002 | Benesty |
| 6,947,549 | B2 | 9/2005 | Yiu |
| 7,650,004 | B2 | 1/2010 | Durant |
| 7,738,667 | B2 | 6/2010 | Bramsløw |

(Continued)

FOREIGN PATENT DOCUMENTS

| | | | |
|---|---|---|---|
| EP | 814636 A1 * | 12/1997 | ........... H04R 25/507 |
| EP | 2071875 B1 | 6/2011 | |

(Continued)

OTHER PUBLICATIONS

European Patent Application No. 23161044, filed Mar. 9, 2023; European Search Report, issued Jul. 11, 2023; 7 pages.

(Continued)

*Primary Examiner* — Ryan Robinson
(74) *Attorney, Agent, or Firm* — Mueting Raasch Group

(57) ABSTRACT

A hearing device includes a deep/recurrent neural network trained to jointly perform sound enhancement and feedback cancellation. During training a neural network is connected between a simulated input and a simulated output of the hearing device. The neural network is operable to change a response affecting the simulated output. The neural network is trained by applying the simulated input to the deep neural network while applying the feedback path response between the simulated input and the simulated output. The deep-neural network is trained to reduce an error between the simulated output and the reference audio signal and used for sound enhancement in the device.

20 Claims, 12 Drawing Sheets

(56) References Cited

U.S. PATENT DOCUMENTS

| | | | | |
|---|---|---|---|---|
| 8,355,794 | B2 | 1/2013 | Lineaweaver | |
| 8,942,398 | B2 | 1/2015 | Salvetti | |
| 9,723,413 | B2 | 8/2017 | Dittberner | |
| 10,097,930 | B2 | 10/2018 | Nakagawa | |
| 10,803,881 | B1 | 10/2020 | Fazeli | |
| 10,811,028 | B2 | 10/2020 | Bucher | |
| 11,109,166 | B2 * | 8/2021 | Jensen | H04R 25/505 |
| 11,330,378 | B1 * | 5/2022 | Jelcicová | G10L 21/0232 |
| 11,696,079 | B2 * | 7/2023 | Jelcicová | H04R 25/407 381/317 |
| 12,069,470 | B2 * | 8/2024 | Sporer | H04R 5/033 |
| 12,075,215 | B2 * | 8/2024 | Casper | H04R 25/602 |
| 2016/0111107 | A1 | 4/2016 | Erdogan | |
| 2017/0061978 | A1 | 3/2017 | Wang | |
| 2017/0156009 | A9 | 6/2017 | Natarajan | |
| 2019/0253813 | A1 | 8/2019 | Pedersen | |
| 2020/0020313 | A1 | 1/2020 | Hua | |
| 2021/0195345 | A1 | 6/2021 | Fitz | |
| 2023/0044509 | A1 * | 2/2023 | Guo | H04R 25/507 |
| 2023/0164509 | A1 * | 5/2023 | Sporer | H04S 3/008 381/309 |

FOREIGN PATENT DOCUMENTS

| | | | | |
|---|---|---|---|---|
| WO | WO 2021/242571 | A1 | | 12/2021 |
| WO | WO-2022256577 | A1 | * | 12/2022 |

OTHER PUBLICATIONS

Carbajal et al: "Joint NN-Supported Multichannel Reduction of Acoustic Echo, Reverberation and Noise", arxiv.org, Cornell University Library, 201 Olin Library Cornell University Ithaca, NY 14853, Jul. 27, 2020 (Jul. 27, 2020), XP081704527, DOI: 10.1109/TASLP.2020.3008974.

Cortes: "Recurrent Neural Networks", , Jan. 19, 2017 (Jan. 19, 2017), XP093061689, Retrieved from the Internet: URL:https://www.mathematik.uni-muenchen.de/~deckerVteaching/WS1819/ATML/torregrosa_recurrent_neural_networks.pdf [retrieved on Jul. 6, 2023].

Cyberlympha: "Recurrent Neural Networks in Reinforcement Learning", , Feb. 21, 2022 Feb. 21, (2022), XP093061653, Retrieved from the Internet: URL:https%3A%2F%2Fmedium.com%2F%40cyberlymph%2Frecurrentneural-networks-in-reinforcement-learning-11600819ede4 [retrieved on Jul. 6, 2023].

Haubner et al: "Deep Learning-Based Joint Control of Acoustic Echo Cancellation, Beamforming and Postfiltering", arxiv.org, Cornell University Library, 201 Olin Library Cornell University Ithaca, NY 14853, Mar. 3, 2022 (Mar. 3, 2022), XP091176293.

PCT Application No. PCT/US2021/032928, filed May 18, 2021, PCT Search Report and Written Opinion, issued Jul. 9, 2021, 23 pages.

PCT Application No. PCT/US2021/032928, filed May 18, 2021, International Preliminary Report on Patentability, issued Nov. 17, 2022, 16 pages.

Nordholm, Sven, et al. "Stability-controlled hybrid adaptive feedback cancellation scheme for hearing aids." *The Journal of the Acoustical Society of America* 143.1 (2028); 150-166.

Costa Marcio H. et al. "A robust variable step size algorithm for LMS adaptive filters." *2006 IEEE International Conference on Acoustics Speech and Signal Processing Proceedings*. vol. 3 IEEE, 2006.

Vega, Leonardo Rey, et al. "A new robust variable step-size NLMS algorithm." *IEEE Transactions on Signal Processing*. 56.5 (2008): 1878-1893.

Mader, Andreas, et al . . . "Step-size control for acoustic echo cancellation filters—an overview." Signal Processing 80.9 (2000): 1697-1719.

Spriet, Ann, et al. "Adaptive feedback cancellation in hearing aids with linear prediction of the desired signal." IEEE Transactions on signal processing 53.10 (2005): 3749-3763.

Kwong, Raymond H., et al . . . "A variable step size LMS algorithm." IEEE Transactions on signal processing 40.7 (1992): 1633-1642.

Arenas-Garcia, Jeronimo, et al. "Combinations of adaptive filters: performance and convergence properties." IEEE Signal Processing Magazine 33.1 (2015): 120-140.

A. Spriet, et al., "Adaptive feedback cancellation in hearing aids," J. Franklin Inst., vol. 343, No. 6, pp. 545-573, Sep. 2006.

J. Huo, et al., "A robust transform domain echo canceller employing a parallel filter structure," Signal Processing, vol. 86, No. 12, 2006.

International Patent Application No. PCT/US2021/032928, filed May 18, 2021; International Preliminary Report on Patentability issued Dec. 8, 2022; 16 pages.

* cited by examiner

APPARATUS AND METHOD FOR SPEECH ENHANCEMENT AND FEEDBACK CANCELLATION USING A NEURAL NETWORK

RELATED PATENT DOCUMENTS

This application claims the benefit of U.S. Provisional Application No. 63/318,069, filed on Mar. 9, 2022, and U.S. Provisional Application No. 63/330,396, filed on Apr. 13, 2022, both of which are incorporated herein by reference in their entireties.

SUMMARY

This application relates generally to ear-level electronic systems and devices, including hearing aids, personal amplification devices, and hearables. In one embodiment, an apparatus and method facilitate training a hearing device. A data set is provided that includes: a reference audio signal; a simulated input comprising the reference audio signal combined with additive background noise; and a feedback path response. A deep neural network is connected between the simulated input and a simulated output of the hearing device. The deep neural network is operable to change a response affecting the simulated output. The deep neural network is trained by applying the simulated input to the deep neural network while applying the feedback path response between the simulated input and the simulated output. The deep-neural network is trained to reduce an error between the simulated output and the reference audio signal. The trained deep neural network is used for audio processing in the hearing device.

In another embodiment, a hearing device includes an input processing path that receives an audio input signal from a microphone. An output processing path of the device provides an audio output signal to a loudspeaker. A processing cell is coupled between the input processing path and the output processing path. The processing cell includes: an encoder that extracts current features at a current time step from the audio input signal; a recurrent neural network coupled to receive the current features and enhance the current features with respect to previous enhanced features extracted from a previous time step, the recurrent neural network trained to jointly perform sound enhancement and feedback cancellation; and a decoder that synthesizes a current audio output from the enhanced current features, the current audio output forming the audio output signal. The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Embodiments described herein relate to apparatuses and methods for simultaneous calibration of feedback cancellation and training a speech enhancement system using deep neural networks (DNNs) for a hearing aid or a general audio device. The resulting algorithm can be used to automatically optimize the parameters of the audio device feedback canceller and the speech enhancement modules in a joint fashion on a set of pre-recorded training audio data so that the amount of background noise and acoustic feedback present in the samples is maximally reduced and overall quality and speech intelligibility of the device audio output is improved. While the proposed training algorithm is run offline either on a workstation or in the cloud, the resulting optimized feedback canceller and speech enhancement models can be used and run inside the device during its normal operation. Such automated procedure of parameter calibration of the two systems can provide various benefits for the operation of each of them (e.g., improved robustness of the speech enhancement against chirping, enhanced performance of the feedback canceller in a wider range of environment conditions (both static and dynamic feedback), and reduced artifacts introduced to the device output compared to when parameters are sub-optimally calibrated for each module in isolation).

Existing machine-learning-based methods are known that can calibrate multiple audio processing systems in conjunction with each other using a DNN or other machine-learning algorithm (e.g., hidden Markov model, or HMM). In contrast to this, the present embodiments describe machine-learning-based method for simultaneous training/calibration of two specific applications: speech enhancement and acoustic feedback cancellation. Such an implementation can potentially result in a unified system in which a single module can mitigate both background noise and acoustic feedback present in audio devices comprising a microphone and a loudspeaker and hence improve both sound quality and speech intelligibility.

Figure 1:
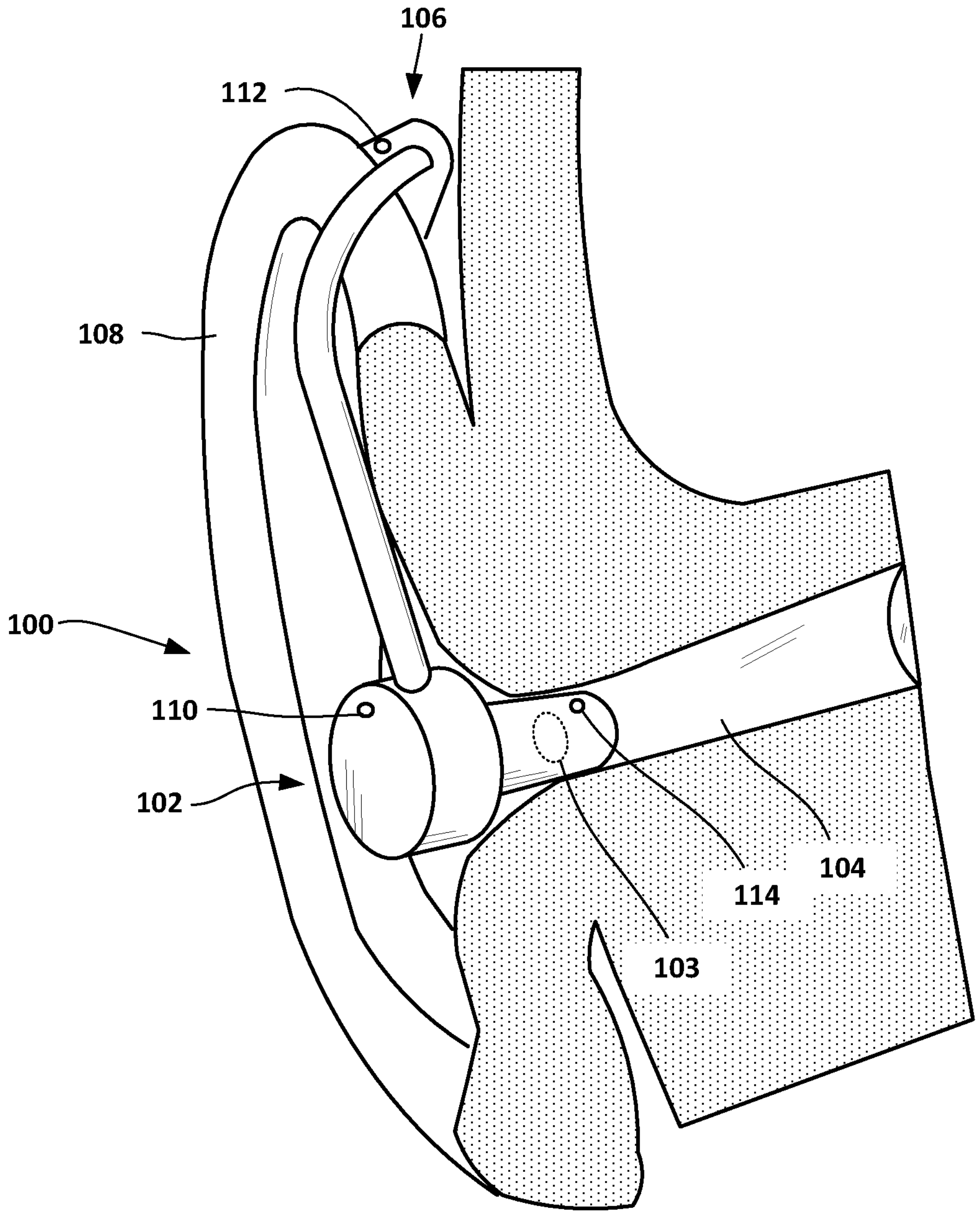
FIG. 1 is an illustration of a hearing device according to an example embodiment.

In FIG. 1, a diagram illustrates an example of an ear-wearable device 100 according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically and/or acoustically coupled to the internal portion 102. The in-ear portion 102 may include an acoustic transducer 103, although in some embodiments the acoustic transducer may be in the external portion 106, where it is acoustically coupled to the ear canal 104, e.g., via a tube. The acoustic transducer 103 may be referred to herein as a "receiver," "loudspeaker," etc., however could include a bone conduction transducer. One or both portions 102, 106 may include an external microphone, as indicated by respective microphones 110, 112.

The device 100 may also include an internal microphone 114 that detects sound inside the ear canal 104. The internal microphone 114 may also be referred to as an inward-facing microphone or error microphone. Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 show one example of a hearing device, often referred to as a hearing aid (HA), the term hearing device of the present disclosure may refer to a wide variety of ear-level electronic devices that can aid a person with impaired hearing. This includes devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

A hearing aid device comprises several modules each responsible to perform certain processing on the device audio input. These modules are often calibrated/trained in isolation disregarding the interactions between these modules and how the device output changes its input due to acoustic coupling of the hearing aid receiver and the hearing microphone. Two modules in the hearing aid that react this way are speech enhancement and feedback canceller.

While there are a number of approaches to speech enhancement, one approach that is proving effective is the use of machine learning, in particular DNNs. A DNN-based speech enhancement/noise suppression system is trained on pre-recorded data to suppress artificially added background noise to clean reference signals. Currently such methods are unable to handle artifacts arising from acoustic feedback since their training process cannot simulate the acoustic feedback and possibly existing feedback cancellation mechanisms in the device. The feedback canceller on the other hand is supposed to mitigate the acoustic feedback occurring due to the acoustic coupling of the hearing aid receiver and the hearing microphone, creating a closed loop system.

An important parameter in adaptive feedback cancellation is the step-size, or learning rate, of the adaptive filter used to estimate the acoustic feedback path. This learning rate provides a trade-off between fast convergence but larger estimation error for high learning rates and slow convergence but more accurate estimation for slower learning rates. The choice of the learning rate typically depends on the signal of interest. For example, for signals that are highly correlated over time (tonal components in music or sustained alarm sounds) a slower adaptation rate is preferred, while for other signals faster adaptation rates could be used.

One approach to automate choosing the feedback canceller step-size is to use a chirp detector and, e.g., extract certain statistics from the input (e.g., chirping rates) and automatically adjust the step-size of feedback canceller based on that. However, any change in the feedback canceller itself will change the structure of the input signals of the chirp detector, which can affect its performance and potentially the whole feedback cancellation mechanism.

Additionally, decorrelation of the desired input signal and the feedback signal in the microphone is an salient aspect in adaptive feedback cancellation. To achieve decorrelation, a non-linear operation like a frequency shift or phase-modulation can be applied to the output signal of the hearing aid. The amount of frequency shift trade-offs between increase in decorrelation and thus improved performance of the adaptive feedback cancellation algorithm and audibility of distortions, e.g., inharmonicities.

Embodiments described herein solve the above chicken-and-egg problems by accounting the interactions between the input and output of these modules through closed-loop simulation of the system and simultaneously training the speech enhancement model and feedback canceller step-size adjustment mechanism in the hearing aid device. This can result in a straightforward implementation on the hearing device, one that can easily be adapted and updated by changing the DNN model. In some embodiments, the DNN can be trained to process the sound signal directly to reduce feedback. In other embodiments, the DNN can be trained to change a step size of an existing feedback canceller.

Figure 2:
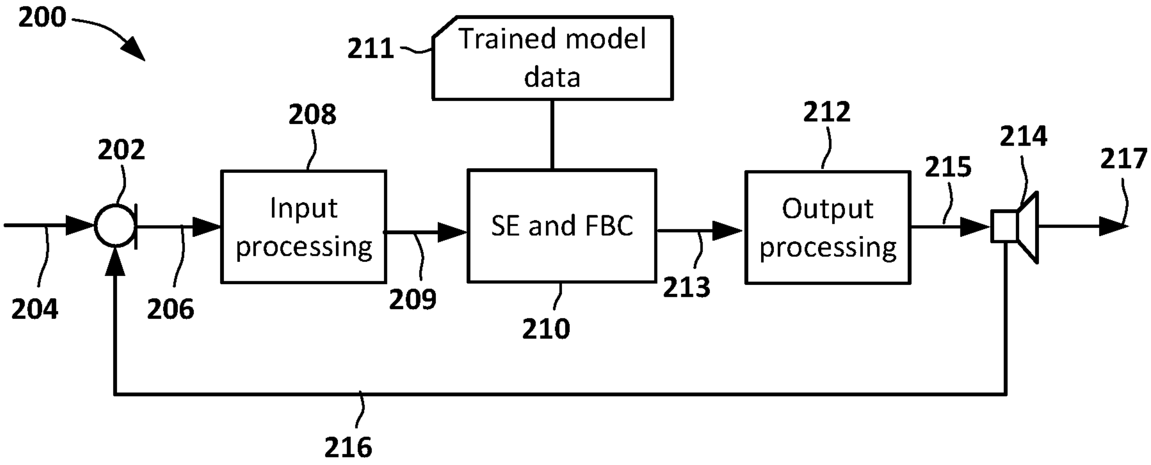
FIG. 2 is a block diagram of a processing path according to an example embodiment.

In FIG. 2, a block diagram shows a simplified view of a hearing device processing path 200 according to an example embodiment. A microphone 202 receives external sound 204 and produces an input audio signal 206 in response. The audio signal 206 is received by an input processing block 208, which may include circuits such as filters, preamplifiers, analog-to-digital converters (ADCs) as well as digital signal processing algorithms (e.g., digital filters, conversion between time and frequency domains, up/down sampling, etc.). A digital signal 209 is output from the input processing block 208 and may represent an audio signal in a time domain or a frequency domain.

A sound enhancement (SE) and feedback canceller (FBC) block 210 receives the signal 209 and processes it according to trained model data 211 that is obtained through a training process described in greater detail below. The SE and FBC block 210 enhances speech and suppresses feedback (as indicated by feedback path 216) to produce an enhanced audio signal 213, which is input to an output processing block 212. The output processing block 212 may include circuits such as filters, amplifiers, digital-to-analog converters (DAC) as well as digital signal processing algorithms similar to the input processing block 208.

The output processing block 212 produces an analog output audio signal 215 that is input to a transducer, such as a receiver (loudspeaker) 214 that produces sound 217 in the ear canal. Some part of this sound 217 can leak back to the microphone 202, as indicated by feedback path 216. Because FIG. 2 is a simplified diagram, it does not include other possible processing components that may be employed in a hearing device such as compensation for hearing loss, signal compression, signal expansion, active noise cancellation, etc. Those additional functions can be employed in one or both of the input or output processing blocks 208, 212. As will be describe below, the input and output processing blocks 208, 210 can be simulated (e.g., on a computer workstation) during training of the network used by the SE and FBC block 210.

Figure 3:
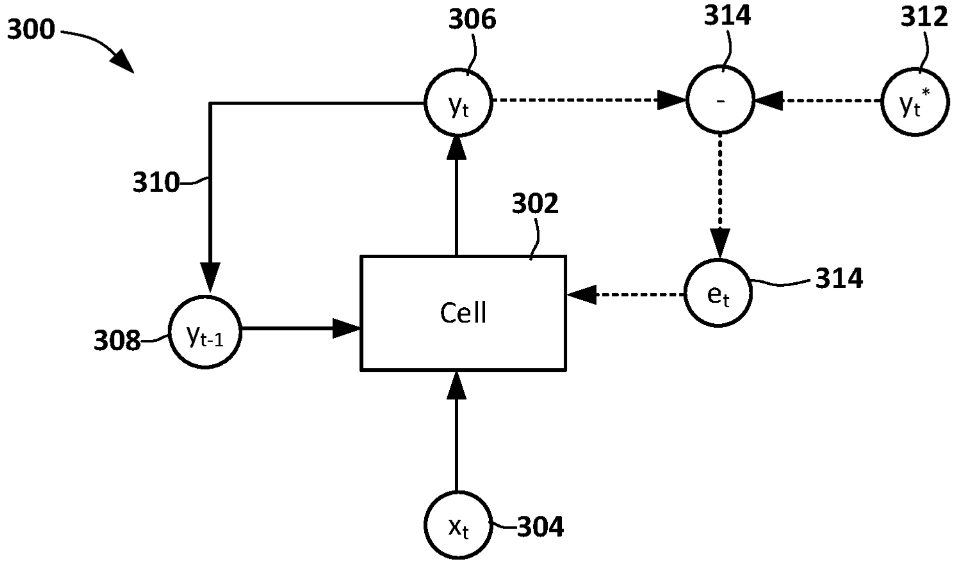
FIGS. 3-6 are diagrams of recurrent neural network cells according to example embodiments.

The technical consequence of a hearing aid providing, due to feedback, more amplification than is possible to handle during normal operation include perceptible artifacts such as chirping, howling, whistling and instabilities. A feedback cancellation algorithm is employed to reduce or eliminate these artifacts. Often, these artifacts occur due a significant change of the acoustic feedback path while the adaptive feedback cancellation algorithm has not yet adapted to the new acoustic path. In other cases, the adaptive feedback cancellation algorithm may maladapt to strongly self-correlated incoming signals this results in so-called entrainment. Another aspect to consider in the hearing device design the so-called maximum stable gain. The maximum stable gain is defined as the gain of the hearing aid that can be applied without the hearing aid being unstable, e.g., the maximum gain that is possible during normal operation. This gain is frequency dependent, e.g., some frequencies are more prone to induce feedback than others. In order to effectively implement an SE and FBC processing block 210, a number of aspects will be considered. First, the type of DNN used by the SE and FBC processing block 210 may include at least a recurrent neural network (RNN). In other embodiments, an SE module can include convolutional layers, multi-layer perceptrons or combinations of these layers, as well as alternate recurrent networks, such as transformer networks. A simplified diagram of an RNN 300 according to an example embodiment is shown in FIG. 3. The RNN 300 includes a cell that 302 receives input features 304. The input 304 is a representation of the audio signal in the time or frequency domain for a particular time t. The cell 302 has a trained set of neurons that process the inputs 304 and produce outputs 306. The outputs 306 provide the processed audio, e.g., with SE and FBC applied.

The recurrency of the RNN 300 is due to a memory capability within the cell 302. Generally, tasks such as speech recognition, text prediction, etc., have a temporal dependence, such that the next state may depend on a number of previous states. This is represented in FIG. 3 with line 310, that uses the current output 306 as previous input 308 which can be stored to be processed at the next time. Oftentimes, an RNN is represented in an “unrolled” format, with multiple cells shown connected in series for different times (t−1, t, t+1), and this unrolled representation may be used in subsequent figures for a better understanding of the interaction between modules within the RNN processing cell.

The RNN 300 is trained in a manner similar to other neural networks, in that a training set that includes inputs and desired outputs are fed into the RNN 300. In FIG. 3, the training operations indicated by dotted lines and the desired output feature 312 at time t is shown as $y_t^*$. A difference 314 between the actual output 306 and the desired output 312 is an error value/vector that can be used to update the parameters of the RNN 300, such as weights (and optionally biases). Algorithms such as backpropagation through time can be used to perform this enhancement/update of the RNN 300. For SE processing, the training set can be obtained by recording clean speech signals (the desired output) and processing the speech signals (e.g., adding distortion, background noises, filtering, etc.) which will form the input to the RNN 300. The RNN 300 can be adapted to add feedback artifacts during the training, as will be described in greater detail below.

Figure 4:
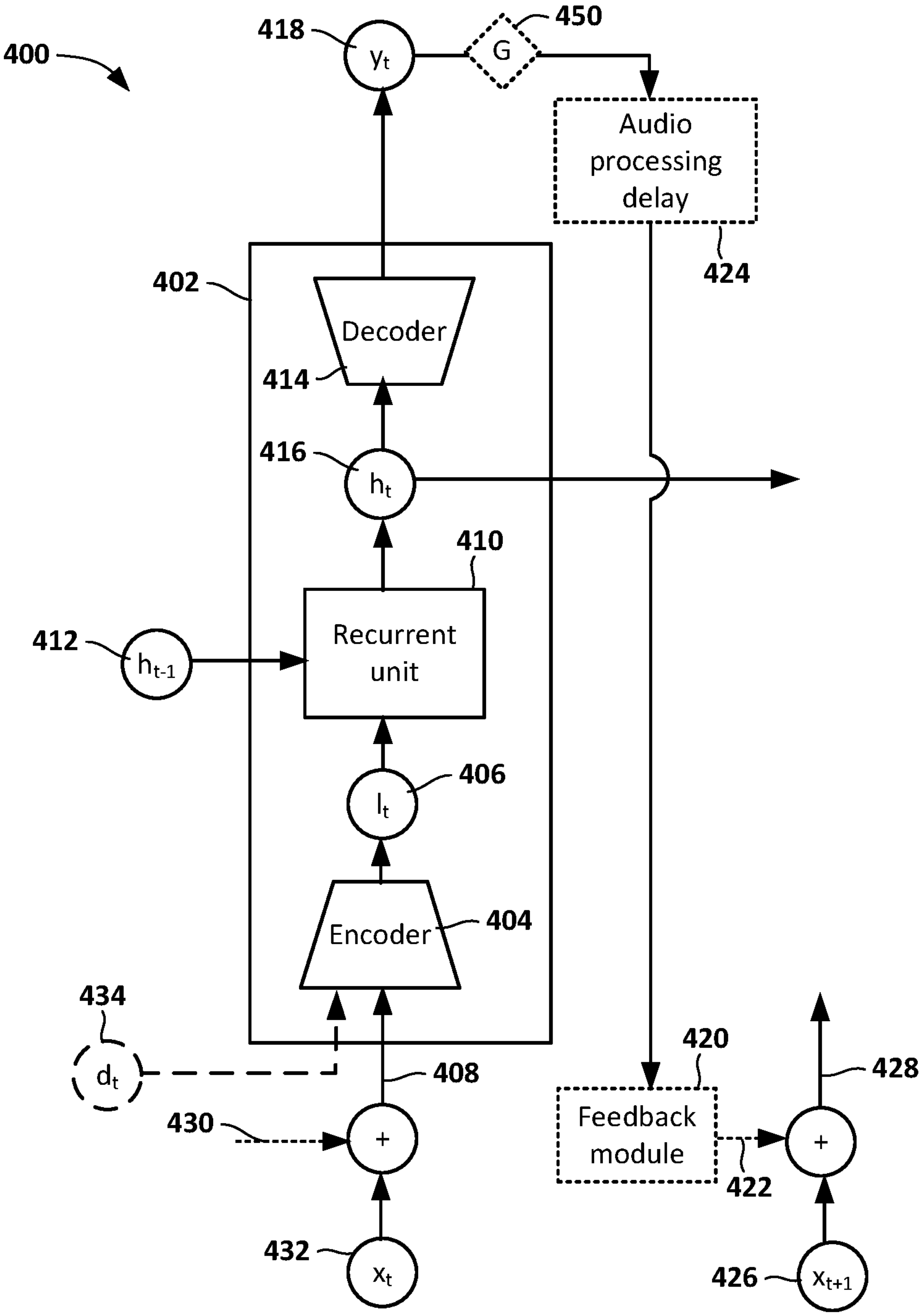

In FIG. 4, a block diagram shows an RNN cell 400 that can be used in an SE and FBC enhancement module according to an example embodiment. The RNN cell 400 includes a speech enhancement module 402 with an encoder 404 that extracts current features 406 from a current audio input 408 to the RNN cell 400. A recurrent unit 410 (which includes an RNN or other recurrent type network) receives the current features 406 and enhances the current features 406 with respect to previous features 412 extracted from the previous time discrete time step. A decoder 414 synthesizes the current audio output 418 from the enhanced current features 416.

The RNN cell 400 may include additional features that are present during training of the recurrent unit 410. A feedback module 420 produces a next feedback component input 422 from the current audio output 418 of the RNN cell and a feedback path response that is estimated for the device. The feedback module 420 simulates acoustic coupling between the output of the model and future inputs. An audio processing delay 424 is shown between the current audio output 418 and the feedback module 420, which simulates expected processing delays in the target device that affect the production of feedback. The next feedback component 422 is combined with the input signal 426 to form a next audio input 428 at the next time step. Similarly, a previous output frame 430 from a previous time step is combined with the input signal 432 at the current time step. In this case, the previous output frame 430 includes a previous feedback component. The current audio input 408 in such a case is a sum of the input signal 432 and the previous feedback component.

Figure 5:
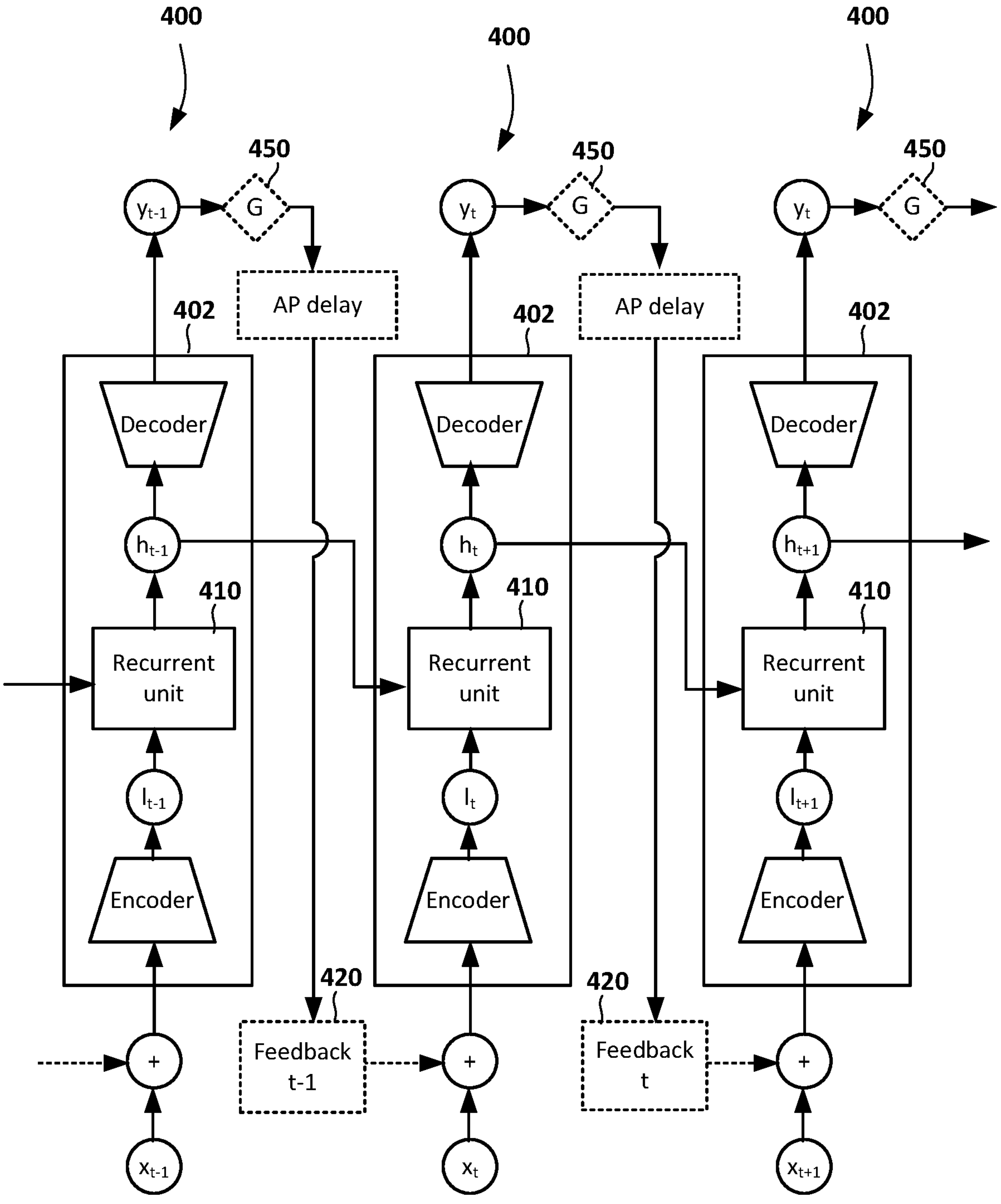

The RNN cell 400 as shown in FIG. 4 can use a training set similar to what is used for SE training, e.g., a clear audio speech reference signal and a degraded version of the reference signal used as input. In some embodiments, the encoder 404 may also extract features from other sensor data 434, such as a non-audio signal from an inertial measurement unit (IMU), a heart rate signal, a blood oxygen level signal, a pressure sensor, etc. This other data 434 may also be indicative of a condition that may induce feedback (e.g., sensing a sudden movement that shifts the hearing device within the user’s ear), and so training may couple a simulation of this other sensor data 434 with the simulated feedback induced by the feedback module 420. The feedback module 420 and audio processing delay 424 unit would not be included in an operational hearing device, however the other sensor data 434 could be used in the operational hearing device. In FIG. 5, a block diagram shows the cell 400 in FIG. 4 unrolled into three time steps. In Table 1 below, additional details are provided regarding configuration of the neural networks described herein.

TABLE 1

| | |
|---|---|
| Network Topology and Use of Recurrent Units | Two standard GRU layers followed by a linear layer and ReLu activation function. The number of hidden units and the output size of GRU layers are 64. |

TABLE 1-continued

| | |
|---|---|
| | To simulate feedback path the receiver output is convolved by time-varying or static impulse responses representing the coupling between hearing aid input-output (previously measured or synthesized) stored and sampled from a dataset using overlap-add method applied to frames of length 64 with overlaps of 8 samples extracted from reconstructed hearing aid model output waveform signal. |
| Data format for inputs and outputs | The input of the GRU layers are 16-band WOLA magnitude features extracted from microphone input frames of length 64 samples with 8 sample overlaps between adjacent frames. The Linear layer + ReLu activation converts the 64 outputs of the $2^{nd}$ GRU layer to 16 positive real-valued numbers representing the gains that are applied on (multiplied by) the extracted microphone WOLA features estimating the WOLA features of the receiver output frames. These frames each of length 32 are overlapped and added (8 sample overlaps) to generate receiver output waveform samples. |
| Propagation function | "Backpropagation through time" is used to compute the gradients of the loss function representing the error between reconstructed and target signal at the output the hearing aid model over time with respect to the weights and the biases of the speech enhancement module Adam optimization method is used to update parameters of the model using the computed gradients. For the Adam method, we use an initial learning rate of 2e−4 and beta1 = 0 and beta2 = 0.9. We reduce the learning rate by a factor of 10 every 100 epochs. |
| Transfer/Activation function: | Sigmoid for GRU layers, ReLu at the output of the linear layer |
| The learning paradigm | Supervised learning to optimize speech enhancement module using pairs of noisy signals and their corresponding clean signals |
| Training dataset | Multiple hours of speech signals (80% train- 10% test - 10% test) contaminated by different environmental background noise types at different SNR levels. The feedback path impulse responses are sampled randomly from a dataset of static impulse responses (80% train- 10% test - 10% test) measured from different devices. At the time of training the impulse responses are normalized (multiplied by a random gain) so that the corresponding closed loop gain of the system lies in a certain range |
| Cost function | The cost function has (up to) three terms: one represents the error between the output of the model and the clean target signal in time domain and one represents the deviation in frequency domain and (if the non-linear distortion module is trained) one represents the cross-correlation between the input signal in the time domain and the output of the model. For the frequency domain error, a mean square error between the log-WOLA magnitude features is used. For the time-domain term, mean square error is used |
| Starting values | The standard Xavier method is used to initialize weights and biases of the GRU and linear layers |

In the RNNs shown in FIGS. 4 and 5, the recurrent unit 410 is trained for both SE and FBC functions. Note that during training of the recurrent unit 410, the inputs and outputs x, y may be coupled to the speech enhancement module by processing paths that model characteristics the target hearing device. Such a path may simulate other sound the input and output sound processing by a particular device (e.g., sampling rate, equalization, compression/expansion, active noise reduction, etc.) so as to better tailor the trained recurrent unit 410 to a particular device. The audio processing delay 424 and feedback module 420 may similarly model a particular device. Thus, the neural network training may be repeated to tailor the network for different classes or models of hearing devices. The neural network training may also be trained multiple times to provide different network versions for different operating modes of the same device (e.g., active noise cancellation on or off).

Figure 6:
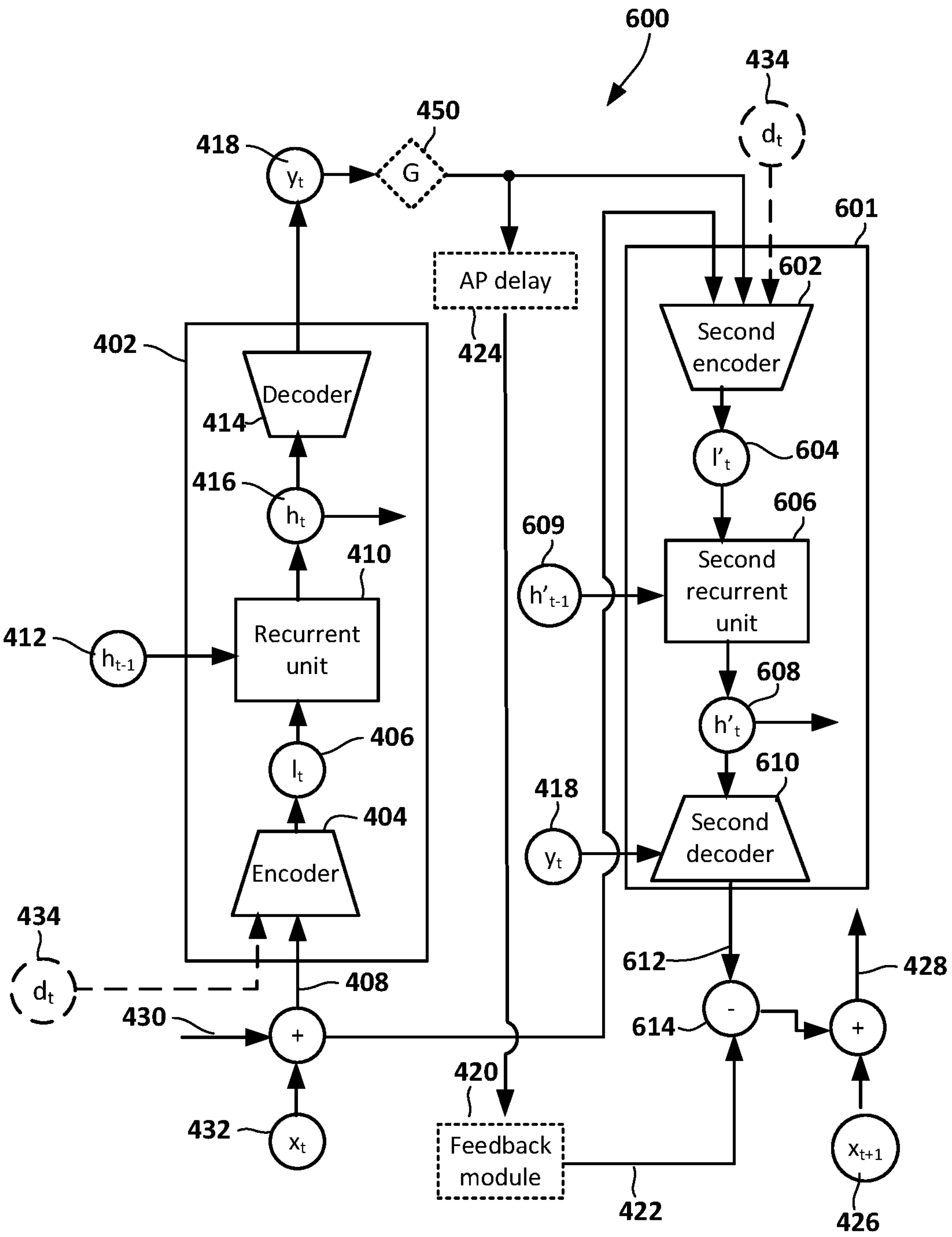

In other embodiments, the RNN can be adapted to include another module dedicated to FBC. In FIG. 6, a block diagram shows an example of an RNN cell 600 for FBC according to another example embodiment. For convenience, the components earlier described in FIG. 4 are included here, with training of the recurrent unit 410 focusing on SE processing. The second RNN cell 600 includes a second encoder module 602 that extracts second features 604 from the current input 432 and previous output frame 418 along with possibly other sensors (such as IMU data, not shown). Note that the non-audio sensor data 434 may be input to the second encoder 602 and/or encoder 404 in which case the sensor data 434 may be used in training one or both of the RNNs 410, 606 together with the other test data.

A second recurrent unit 606 (which includes an RNN and/or other recurrent network structures) updates most recent second features 608 with respect to the previously extracted second features 604, and a second decoder 610 synthesizes a feedback cancellation component 612 which is subsequently subtracted from the audio input signal 426 as shown at subtraction block 614. Second features 609 from a previous time step are input to the second recurrent unit 606. The second encoder 602, second recurrent unit 606, and second decoder 610 all form a feedback cancellation module 601 that is trained differently than the speech enhancement module 402. Note that in this embodiment, the output of the training-only audio-processing delay 424 and feedback simulation module 420 are inserted before the subtraction 614 is performed, the resulting subtracted signal combined with input signal 426 to form the next audio input 428 at the next time step.

In some embodiments, the second network 601 acts in parallel to the acoustic feedback path (components 424 and 420). Thus, output signal 418 goes into second encoder 602 and second decoder 610. Sending the output signal 418 into the second decoder 610 may be optional and depends on the interpretation of the network is expected to learn. If output signal 418 is used as in an input to 610, the second network 601 is expected to learn a representation of the acoustic path between the receiver and the microphone. If output signal 418 is not used as an input to second decoder 610, it is expected that the second network 601 learns to predict the signal coming from the receiver in the microphone.

Also seen in FIGS. 4, 5, and 6 is a gain submodule 450 representing the hearing device gain. The gains are applied to the hearing device output signal 418 in the frequency domain. These gains may vary across frequency bands differently for each user and are pre-calculated based on users' audiological measurements. The closed loop gain of the proposed model includes the gain introduced by the gain submodule 450, the feedback path gain (via feedback module 420) and the gain that the recurrent unit 410 introduces to frequency bands of its input. The gain submodule 450 can be used to gradually increase hearing device gains during training to increase stability of the training procedure, as will be described in greater detail below.

Figure 7:
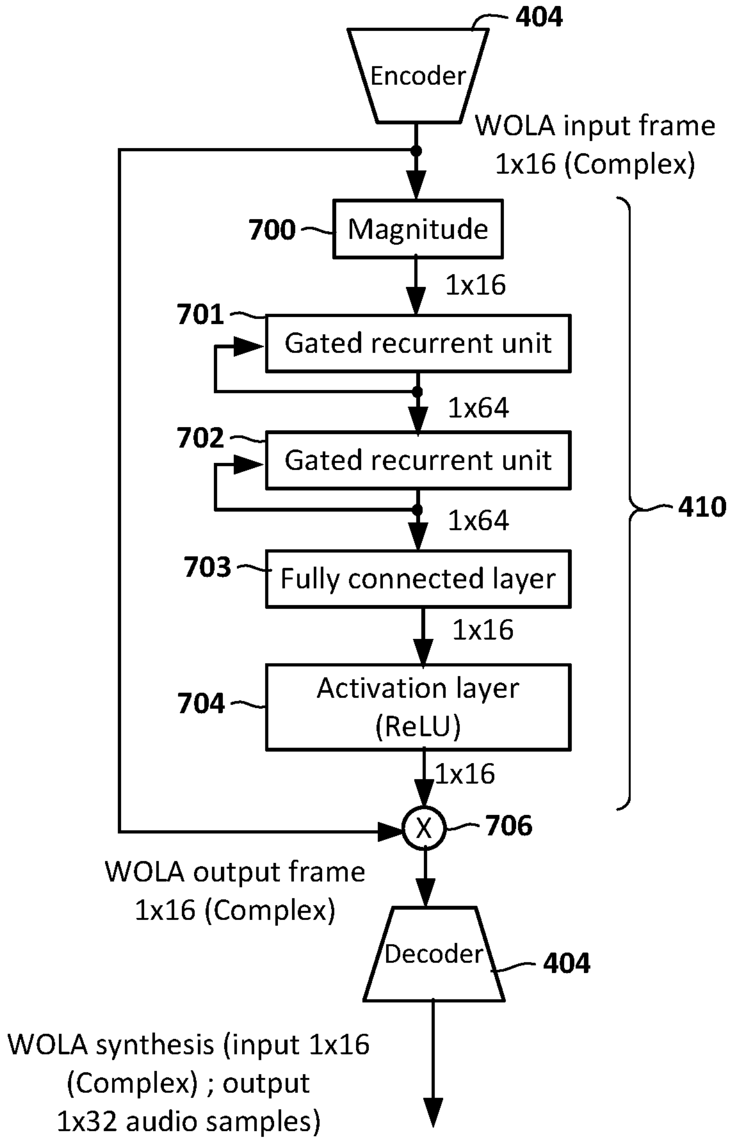
FIG. 7 is a block diagram of a recurrent unit according to an example embodiment.

In FIG. 7, a diagram shows details of the recurrent unit 410 in the speech enhancement module 402 according to an example embodiment. The encoder 404 uses a weighted overlap add (WOLA) synthesis module to produce a 1×16 input frame of complex values extracted from a transform of the audio stream. A 1×16 representation of magnitude response is produced by block 700, which is input to a gated recurrent unit (GRU) 701. The GRU 701 expands the 1×16 input to a 1×64 output, which is input to a second GRU 702 which has a 1×64 input and output. A fully connected layer 703 reduces the signal back to 1×16, and an activation layer 704 uses a rectified linear unit (ReLU) activation function to linearize the output function. Element 706 is a gain multiplier, where the gain estimated through the recurrent unit 410 is applied to the encoded signal (here in the WOLA domain). The second recurrent unit 606 of the feedback cancellation module 601 can use a structure similar to the recurrent unit 410 shown in FIG. 7.

Figure 8A:
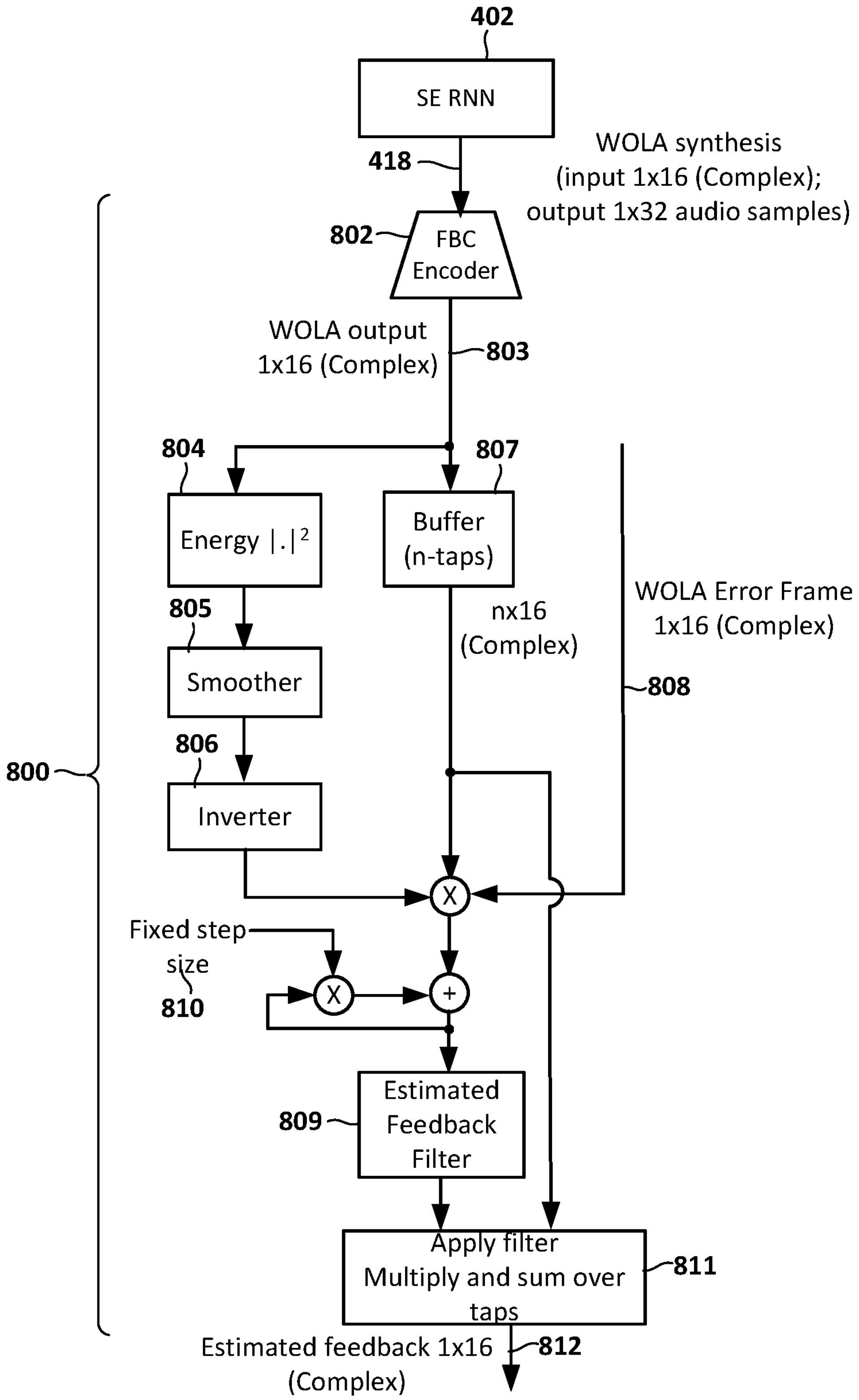
FIGS. 8A, 8B, and 8C are a block diagrams of feedback cancellation units according to example embodiments.

In another embodiment, the DNN-based speech enhancement module 402 can be used with a parametric FBC module, such that the speech enhancement module 402 and FBC module are jointly optimized during training of the recurrent unit 410. In FIG. 8A, a block diagram illustrates details of a parametric feedback cancellation module 800 usable with an DNN-based speech enhancement module 402 according to an example embodiment. The output 418 of the SE recurrent unit 402 is fed into an encoder 802 which reduces the output 418 to a 1×16 complex WOLA input signal 803. The input signal is fed into block 804 where energy of the signal is calculated. The energy signal is smoothed and inverted by blocks 805, 806. The input signal is also fed into a buffer 807 which holds the last n-frames.

The outputs of the buffer 807 and inverter block 806 are multiplied with a WOLA error frame 808. An estimated feedback filter 809 uses a fixed step size 810. At block 811, the filter 809 is applied and other signals are multiplied and summed to produce an estimated feedback signal 812. For FIG. 8A, the DNN-based speech enhancement module can be trained with knowledge about the behavior of the estimated feedback filter 809 which utilizes a user-determined/predetermined fixed step size that is not learned from data.

Figure 8B:
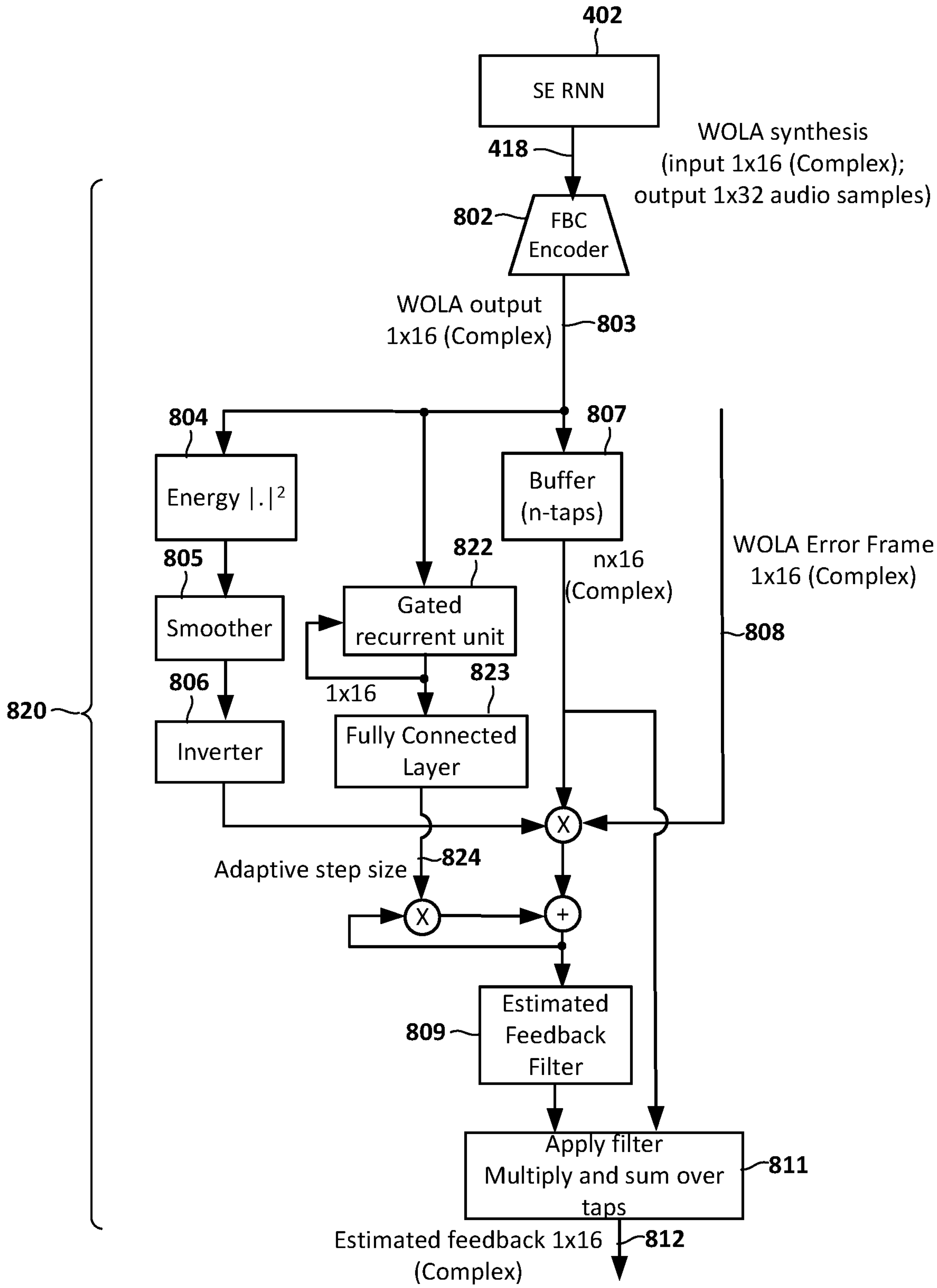

In FIG. 8B, a block diagram illustrates details of a parametric feedback cancellation module 820 usable with an DNN-based speech enhancement module 402 according to another example embodiment. The feedback cancellation module 820 uses analogous components as described above for the module 800 in FIG. 8A, except that the module 820 uses an RNN for determining adaptive step sizes for the estimated feedback filter 809. A gated recurrent unit 822 is trained on the encoded input signal 803 and outputs to a fully connected layer 823 which outputs an optimized adaptive step size 824.

Figure 8C:
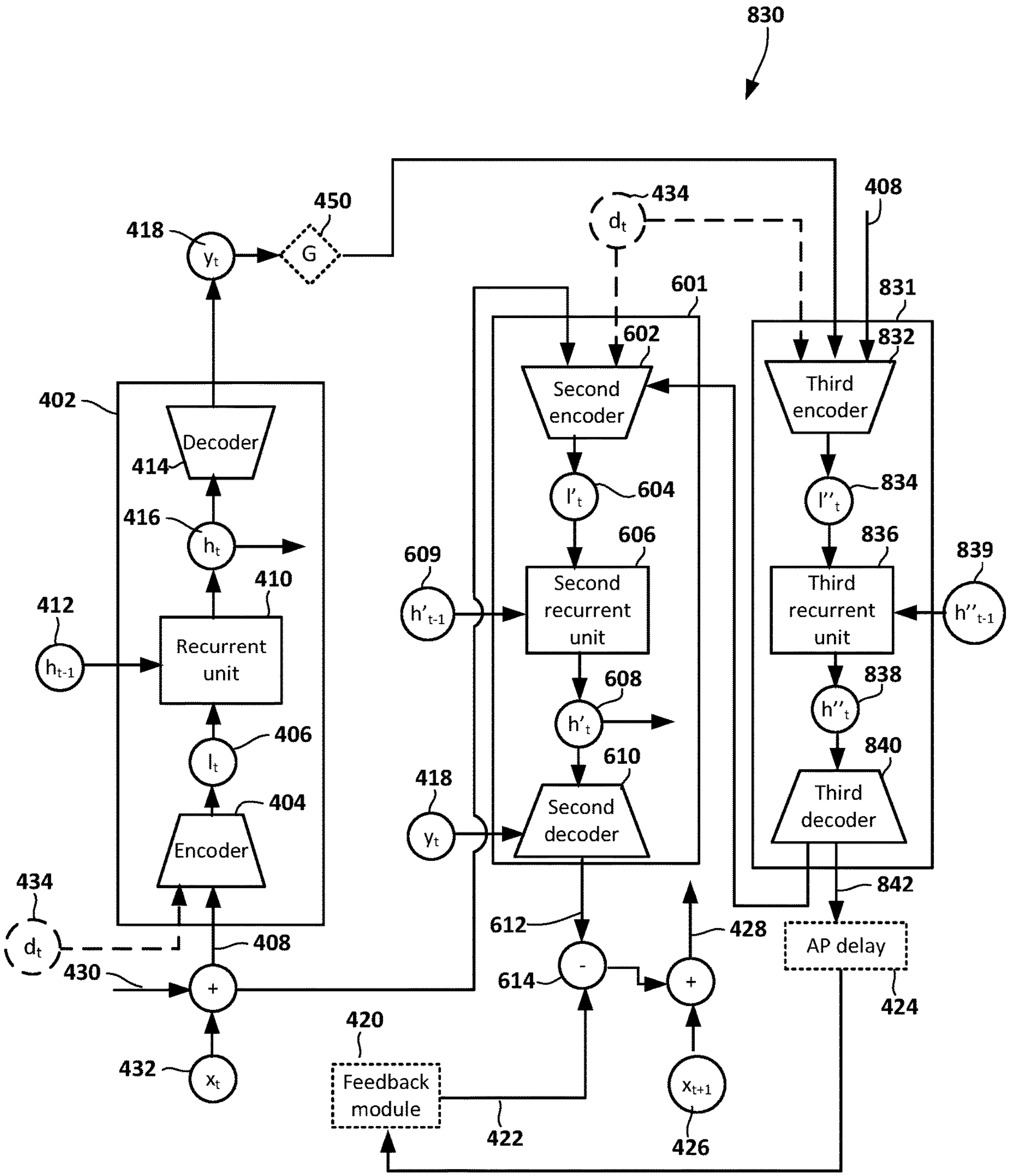

In other embodiments, the RNN can be adapted to include another module dedicated to non-linear distortions of the hearing aid output. In FIG. 8C, a block diagram shows an example of an RNN cell 830 for applying non-linear distortions according to another example embodiment. For convenience, the components earlier described in FIG. 6 are included here, with training of the recurrent unit 402 focusing on SE processing and the recurrent unit 601 focusing on FBC processing. The third RNN cell 820 includes a third encoder module 832 that extracts third features 834 from the audio input 408 and previous output frame 418 along with possibly other sensors (such as IMU data, not shown). Note that the non-audio sensor data 434 may be input to the third encoder 832 and/or encoder 404 in which case the sensor data 434 may be used in training one or both of the RNNs 410, 606 together with the other test data.

A third recurrent unit 836 (e.g., an RNN and/or other recurrent network structures) updates most recent third features 838 with respect to the previously extracted third features 834, and a third decoder 840 synthesizes a non-linear distorted component 842 which is subsequently fed into the AP delay 424 and the second encoder 602. Third features 839 from a previous time step are input to the third recurrent unit 836. The third encoder 832, third recurrent unit 836, and third decoder 840 all form a non-linear distortion module 831 that is trained differently than the speech enhancement module 402.

In another embodiment, the non-linear distortion module 831 can be a parametric module, such that the DNN-based speech enhancement module 402 can be used with a parametric FBC and a parametric non-linear distortion module which are jointly optimized during training. This parametric non-linear distortion module uses as an input the output of the SE recurrent unit 402. The encoder reduces the output to a 1×16 complex WOLA input signal. This complex WOLA input signal is multiplied by a complex exponential $e^{j\phi_t}$, per band, by a WOLA-band specific frequency shift $f_0$ as defined in the phase function $\phi_t=2\pi f_0 tD/f_s$ of the complex exponential, where D represent the decimation factor of the used filterbank.

In another embodiment, the parametric non-linear distortion module is modified to allow for learning of the WOLA-band specific frequency shift $f_0$, A gated recurrent unit is trained on the encoded input signal and outputs to a fully connected layer which outputs and optimized frequency shift parameter.

In some embodiments, the DNN model (e.g., block 210 in FIG. 2) that includes the speech enhancement module 402, feedback cancellation module 601 (if used), non-linear distortion module 831 (if used) and the simulated feedback module 420, is trained directly using a process known as backpropagation through time. However, the backpropagation through time for large complex models such as the one described above can be computationally intensive and very time-consuming. At the same time, the backpropagation through time requires all the processing in the model to be mathematically differentiable.

To address these issues, the whole unit may be trained in an iterative fashion. In this method, at each iteration the current state of the model, including both parametrized and fixed modules, are first used to compute the inputs to each of the modules to be optimized. These inputs, along with the target (desired) outputs of each module, are then used to separately update the parameters of these modules. The iteration between dataset update and module update steps is repeated until an overall error function comprising the individual errors for the optimizable modules converges.

Iterative learning control (ILC) has been previously utilized for optimization of controllers for dynamical systems. Unlike the proposed model in which different modules can have general nonlinear functional forms, existing model-based and model-free ILC methods consider linear or piecewise linear dynamic to model the environment-agent interaction.

In other embodiments, the proposed iterative learning method above can be replaced with reinforcement learning methods to that uses the dataset update step described above to calculate a reward value based on the quality of the closed loop model output signal (perceptual or objective metric) and use those values to update the policy (SE model parameter) in the model update step using methods such as Q-learning.

Figure 9:
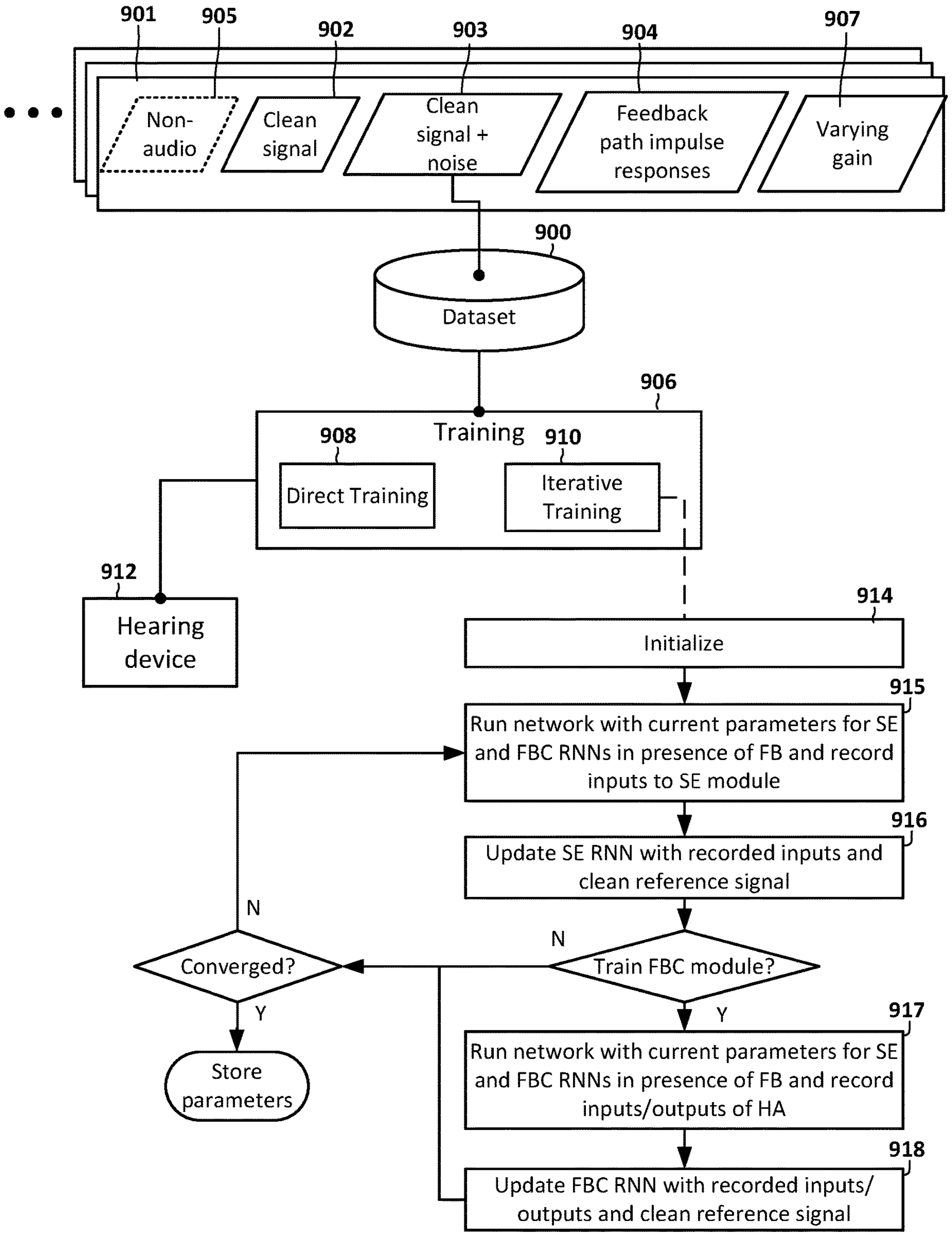
FIG. 9 is a block diagram illustrating training of neural networks according to an example embodiment.

In FIG. 9, a block diagram shows a summary of how the DNN is trained according to an example embodiment. A dataset 900 is collected that includes multiple collections 901 of noisy signals 903 which are contaminated with different types of additive background noise corresponding clean reference signal 902. The collections 901 also include a sequence of feedback path impulse responses 904, measured or simulated, for a specific or various devices, in various conditions (static, dynamic). The collections 901 also include varying gain schedules 907, e.g., a gain values inserted into the simulated output that vary from a lower value to a higher value. The lower value gain values include a maximum stable gain of the hearing device plus an offset. The higher gain value incremented in training to increase an amount of feedback in the system without causing instability during a beginning of the training. The collections 901 may also include non-audio data 905, such as accelerometer data, biometric data, etc., that can be indicated of feedback triggering events and that can be synchronized with time-varying feedback path impulse responses 904.

The dataset 900 is used for a training operation 906, in which the machine-learning parameters of the hearing device processors are optimized. This may include parameters of the speech enhancement module 402 and (if used) the feedback cancellation module 601. This may involve two different procedures, as indicated by blocks 908 and 910. Block 908 is direct training, in which the one or both RNNs (in modules 402 and 601) are simultaneously trained using standard DNN optimization methods so that, given the noisy signal as input, the output of the RNN is as similar as possible to the clean reference signal in presence of the input-output coupling via the feedback path impulse responses. This will repeatedly run the same input signal through the RNN, measure an error/deviation of the output, and backpropagate through the network to update/enhance weights (and optionally biases).

Block 910 represents an iterative method, which involves initializing 914 the parameters of RNNs in modules 402 and 601 to random values or previously sub-optimal ones. The following iterations are repeated until the model converges 920, e.g., based on a neural network convergence criterion such as error/loss being within a threshold value. First, the network is operated 915 with current parameter values of RNNs in modules 402 and 601 in presence of the feedback module 420. The inputs 408, 428 to the SE module 402 (with some level of feedback) are recorded in a data stream and include the test input as well as any feedback introduced by module 420. The recorded data is "played back" along with the clean reference signals to enhance/update 916 values of the DNN within the module 402 using standard DNN optimization methods (e.g., backpropagation through time). The enhanced parameters are used as the current parameters of the SE DNN in the next iteration.

If the feedback canceller module 601 is to be trained, the steps further involve running 917 the network with current parameter values of modules 402 and 601 in presence of the feedback (via feedback module 420) and record the input 432 and output 418 of the hearing device. Parameters of the feedback canceller module 601 are updated/enhanced 918 on the data recorded in the previous step, along with the clean reference signal. The enhanced parameters are used as the current parameters of the FBC DNN in the next iteration.

The optimized parameters found during training 906 are stored on a hearing device 912 where they are used to cancel background noise and mitigate acoustic feedback. The hearing device 912 may use a conventional processor with memory to run the neural network with these parameters and/or may include specialized neural network hardware for this purpose, e.g., a neural network co-processor. Note that the feedback module 420 or audio processing delay block 424 does not need to be used on the hearing device 912.

During training the HA gain values used by gain submodule 450 may be randomly chosen from a range. The upper and lower bounds for the gains depend on the sample impulse response being used and are set to the corresponding maximum stable gain plus an offset value. The offset value for the lower bound is set to a fixed value to ensure the feedback occurs in the system. However, the upper bound offset is incremented during training in order to gradually increase the amount of feedback in the system without overwhelming the network with excessive interference at the beginning of the training.

Figure 10:
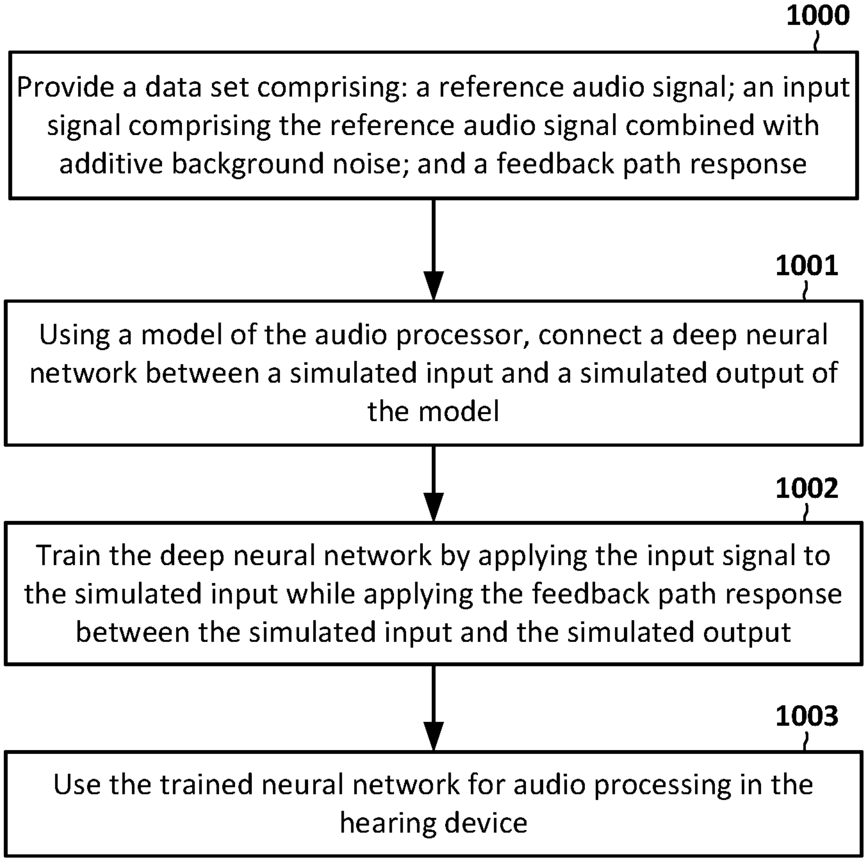
FIG. 10 is a flowchart of a method according to example embodiments.

In FIG. 10, a flowchart shows a method for configuring an audio processor for a hearing device according to an example embodiment. The method involves providing 1000 a data set comprising: a reference audio signal; an input signal comprising the reference audio signal combined with additive background noise; and a feedback path response. Using a model of the audio processor, a deep neural network is connected 1001 between a simulated input and a simulated output of the model. The deep neural network is operable to change a response of the audio processor and affect the simulated output. The deep neural network is trained 1002 by applying the input signal to the simulated input while applying the feedback path response between the simulated input and the simulated output. The deep-neural network is trained to reduce an error between the simulated output and the reference audio signal. The trained neural network is used 1003 for audio processing in the hearing device.

Figure 11:
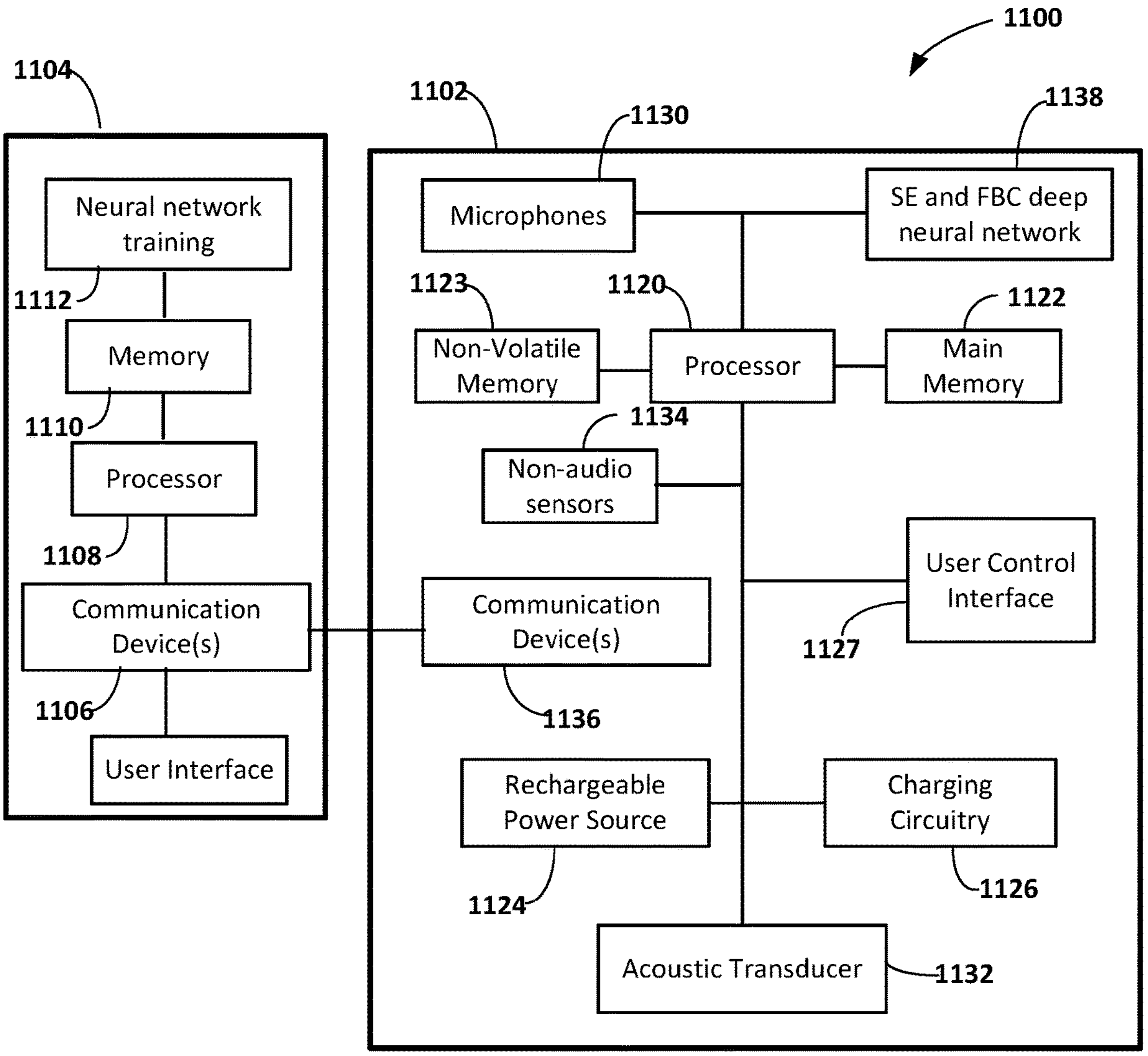
FIG. 11 is a block diagram of a hearing device and system according to an example embodiment.

In FIG. 11, a block diagram illustrates a system and ear-worn hearing device 1100 in accordance with any of the embodiments disclosed herein. The hearing device 1100 includes a housing 1102 configured to be worn in, on, or about an ear of a wearer. The hearing device 1100 shown in FIG. 11 can represent a single hearing device configured for monaural or single-ear operation or one of a pair of hearing devices configured for binaural or dual-ear operation. The hearing device 1100 shown in FIG. 11 includes a housing 1102 within or on which various components are situated or supported. The housing 1102 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1100 includes a processor 1120 operatively coupled to a main memory 1122 and a non-volatile memory 1123. The processor 1120 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1120 can include or be operatively coupled to main memory 1122, such as RAM (e.g., DRAM, SRAM). The processor 1120 can include or be operatively coupled to non-volatile (persistent) memory 1123, such as ROM, EPROM, EEPROM or flash memory. As will be described in detail hereinbelow, the non-volatile memory 1123 is configured to store instructions that facilitate using estimators for eardrum sound pressure based on SP measurements.

The hearing device 1100 includes an audio processing facility operably coupled to, or incorporating, the processor 1120. The audio processing facility includes audio signal processing circuitry (e.g., analog front-end, analog-to-digital converter, digital-to-analog converter, DSP, and various analog and digital filters), a microphone arrangement 1130, and an acoustic transducer 1132 (e.g., loudspeaker, receiver, bone conduction transducer). The microphone arrangement 1130 can include one or more discrete microphones or a microphone array(s) (e.g., configured for microphone array beamforming). Each of the microphones of the microphone arrangement 1130 can be situated at different locations of the housing 1102. It is understood that the term microphone used herein can refer to a single microphone or multiple microphones unless specified otherwise.

At least one of the microphones 1130 may be configured as a reference microphone producing a reference signal in response to external sound outside an ear canal of a user. Another of the microphones 1530 may be configured as an error microphone producing an error signal in response to sound inside of the ear canal. The acoustic transducer 1132 produces amplified sound inside of the ear canal.

The hearing device 1100 may also include a user interface with a user control interface 1127 operatively coupled to the processor 1120. The user control interface 1127 is configured to receive an input from the wearer of the hearing device 1100. The input from the wearer can be any type of user input, such as a touch input, a gesture input, or a voice input. The user control interface 1127 may be configured to receive an input from the wearer of the hearing device 1100.

The hearing device 1100 also includes a speech enhancement and feedback cancellation deep neural network 1138 operably coupled to the processor 1120. The neural network 1138 can be implemented in software, hardware (e.g., specialized neural network logic circuitry), or a combination of hardware and software. During operation of the hearing device 1100, the neural network 1138 can be used to simultaneously enhance speech while cancelling feedback under different conditions as described above. The neural network 1138 operates on discretized audio signals and may also receive other signals indicative of feedback inducing events, such as indicated by non-audio sensors 1134.

The hearing device 1100 can include one or more communication devices 1136. For example, the one or more communication devices 1136 can include one or more radios coupled to one or more antenna arrangements that conform to an IEEE 802.11 (e.g., Wi-Fi®) or Bluetooth® (e.g., BLE, Bluetooth® 4.2, 5.0, 5.1, 5.2 or later) specification, for example. In addition, or alternatively, the hearing device 1100 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 1136 may also include wired communications, e.g., universal serial bus (USB) and the like.

The communication device 1136 is operable to allow the hearing device 1100 to communicate with an external computing device 1104, e.g., a smartphone, laptop computer, etc. The external computing device 1104 includes a communications device 1106 that is compatible with the communications device 1136 for point-to-point or network communications. The external computing device 1104 includes its own processor 1108 and memory 1110, the latter which may encompass both volatile and non-volatile memory. The external computing device 1104 includes a neural network trainer 1112 that may train one or more neural networks. The trained network parameters (e.g., weights, configurations) can be uploaded to the hearing device 1100 and loaded into to the neural network 1138 of the hearing device 1100 to operate as described above.

The hearing device 1100 also includes a power source, which can be a conventional battery, a rechargeable battery (e.g., a lithium-ion battery), or a power source comprising a supercapacitor. In the embodiment shown in FIG. 5, the hearing device 1100 includes a rechargeable power source 1124 which is operably coupled to power management circuitry for supplying power to various components of the hearing device 1100. The rechargeable power source 1124 is coupled to charging circuitry 1126. The charging circuitry 1126 is electrically coupled to charging contacts on the housing 1102 which are configured to electrically couple to corresponding charging contacts of a charging unit when the hearing device 1100 is placed in the charging unit.

This document discloses numerous example embodiments, including but not limited to the following:

Example 1 is a method for configuring an audio processor for a hearing device, the method comprising: providing a data set comprising: a reference audio signal; a simulated input comprising the reference audio signal combined with additive background noise; and a feedback path response. The method further involving connecting a deep neural network between the simulated input and a simulated output of the hearing device, the deep neural network operable to change a response affecting the simulated output; training the deep neural network by applying the simulated input to the deep neural network while applying the feedback path response between the simulated input and the simulated output, the deep-neural network trained to reduce an error between the simulated output and the reference audio signal; and using the trained deep neural network for audio processing in the hearing device.

Example 2 includes the method of example 1, wherein the feedback path response varies as a function of time during the training. Example 3 includes the method of example 1 or 2, wherein the deep neural network comprises a recurrent neural network within a cell that processes audio at discrete times in a sequence. Example 4 includes the method of example 3, wherein the cell comprises: an encoder that extracts current features from a current audio input at a current time step, the current audio input comprising the simulated input at the current time step; the recurrent neural network coupled to receive the current features and enhance the current features with respect to previous enhanced features extracted from a previous time step; and a decoder that synthesizes a current audio output from the enhanced current features, the current audio output forming the simulated output.

Example 5 includes the method of example 4, wherein training the neural network comprises coupling a feedback module to the cell, the feedback module producing a current feedback component from a previous audio output based on the feedback path response, the current feedback component being combined with the current audio input. Example 6 includes the method of example 5, wherein the previous audio output is subject to an audio processing delay before being input to the feedback module. Example 7 includes the method of example 5, wherein the training of the deep neural network further comprises: initializing the recurrent neural network with sub-optimal values; and repeatedly performing, until a convergence criterion is met, iterations comprising: operating the recurrent neural network with current parameter values in presence of the feedback module; recording data comprising the current feedback component combined with the current audio input; and using the recorded data along with the reference audio signal to update values of the recurrent neural network using a neural network optimization, the updated values being used as the current parameter values in a next iteration. Example 7A includes the method of example 7, wherein the training of the deep neural network comprises using reinforcement learning in which, for each iteration, a reward value based on a quality of the recorded data, the reward value used to update the values of the recurrent neural network.

Example 8 includes the method of example 4, wherein the cell further comprises a feedback canceller module comprising: a second encoder that extracts second current features from a combination of the current audio input and the current audio output; a second recurrent unit comprising a second recurrent neural network that receives the second current features and enhances the second current features with respect to second previous enhanced features extracted from the previous time step; and a second decoder that synthesizes a feedback cancellation output from the enhanced second current features, the feedback cancellation output being subtracted from a next audio input at the next time step.

Example 9 includes the method of example 8, wherein the training of the deep neural network comprises: coupling a feedback module to the cell, the feedback module producing a current feedback component from a previous audio output based on the feedback path response, the current feedback component being combined with the current audio input; initializing the recurrent neural network and the second recurrent neural network with sub-optimal values; and repeatedly performing, until a convergence criterion is met, iterations comprising: operating the recurrent neural network and the second recurrent neural network with current parameter values in presence of the feedback module; recording data comprising the current feedback component combined with the current audio input; and using the data along with the reference audio signal to update values of the recurrent neural network using a neural network optimization, the updated values being used as the current parameter values in a next iteration.

Example 9A includes the method of example 9, wherein the training of the deep neural network comprises using reinforcement learning in which, for each iteration, a reward value based on a quality of the recorded data, the reward value used to update the values of the recurrent neural network. Example 10 includes the method of example 9, wherein the previous audio output is subject to an audio processing delay before being input to the feedback module. Example 11 includes the method of example 9, wherein the iterations further comprise: recording second data comprising the current feedback component combined with the current audio input and the current audio output; and using the second data along with the reference audio signal to update second values of the second recurrent neural network using the neural network optimization, the updated second values being used as the current parameter values in the next iteration.

Example 12 includes the method of any one of examples 1-11, wherein the data set further comprises a non-audio measurement signal, and wherein training the deep neural network further comprises applying the non-audio measurement signal together with the input signal to the simulated input while applying the feedback path response between the simulated input and the simulated output. Example 13 includes the method of example 12, wherein the non-audio measurement signal comprises an inertial measurement unit signal. Example 14 includes the method of example 12, wherein the non-audio measurement signal comprises a heart rate signal. Example 15 includes the method of example 12, wherein the non-audio measurement signal comprises a blood oxygen level signal. Example 16 includes the method of example 1, wherein a parametric feedback controller is coupled to an output of the deep neural network and parameters of the parametric feedback controller are jointly optimized with the deep neural network during the training of the deep neural network, the jointly optimized parametric feedback controller used together with the trained deep neural network for the audio processing in the hearing device.

Example 17 includes the method of example 16, wherein the feedback parametric controller comprises a recurrent unit that is trained to determine an adaptive filter step size during the training of the deep neural network. Example 18 is a hearing assistance device comprising a memory that stores the trained deep neural network obtained using the method of any of examples 1-17, the hearing assistance device using the trained neural network for operational audio processing. Example 17A includes the method of example 1, wherein training the deep neural network further comprises inserting a gain in the simulated output, the gain varying across frequency bands, a magnitude of the gain being gradually increased during the training to induce feedback via the feedback path response. Example 17B includes the method of example 17A, wherein the magnitude of the gain varies from a lower value to a higher value, the lower value comprising a maximum stable gain of the hearing device plus an offset, the higher value being greater than the lower value and incremented in training to increase an amount of feedback in the system without causing instability during a beginning of the training.

Example 19 is a hearing assistance device, comprising: an input processing path that receives an audio input signal from a microphone; an output processing path that provides an audio output signal to a loudspeaker; a processing cell coupled between the input processing path and the output processing path. The processing cell comprises: an encoder that extracts current features at a current time step from the audio input signal; a recurrent neural network coupled to receive the current features and enhance the current features with respect to previous enhanced features extracted from a previous time step, the recurrent neural network trained to jointly perform sound enhancement and feedback cancellation; and a decoder that synthesizes a current audio output from the enhanced current features, the current audio output forming the audio output signal.

Example 20 includes the hearing assistance device of example 19, wherein the encoder further receives a non-audio measurement signal that is used together with the audio input signal to extract the current features, and wherein the recurrent neural network is trained to jointly perform sound enhancement and feedback cancellation using the audio measurement signal together with the non-audio input signal. Example 21 includes the hearing assistance device of example 20, wherein the non-audio measurement signal comprises at least one of an inertial measurement unit signal, a heart rate signal, and a blood oxygen level signal.

Example 22 includes the hearing assistance device any one of examples 19-21, further comprising a parametric feedback controller coupled to the decoder, parameters of the parametric feedback controller being jointly optimized with the recurrent neural network during training of the recurrent neural network, the jointly optimized parametric feedback controller used together with the recurrent neural network for audio processing in the hearing assistance device. Example 23 includes the hearing assistance device of example 22, wherein the feedback parametric controller comprises a recurrent unit that is trained to determine an adaptive filter step size during the training of the recurrent neural network.

Example 24 is a hearing assistance device, comprising: an input processing path that receives an audio input signal from a microphone; an output processing path that provides an audio output signal to a loudspeaker; a processing cell coupled between the input processing path and the output processing path. The processing cell comprises: a first encoder that extracts first current features at a current time step from the audio input signal; a first recurrent neural network coupled to receive the first current features and enhance the first current features with respect to first previous enhanced features extracted from a previous time step; a first decoder that synthesizes a current audio output from the enhanced first current features, the current audio output forming the audio output signal; a second encoder that extracts second current features from a combination of the current audio input and the current audio output; a second recurrent neural network that receives the second current features and enhances the second current features with respect to second previous enhanced features extracted from the previous time step; and a second decoder that synthesizes a feedback cancellation output from the enhanced second current features, the feedback cancellation output being subtracted from the audio output signal, wherein the first and second recurrent neural networks are trained to jointly perform sound enhancement and feedback cancellation.

Example 25 includes the hearing assistance device of example 24, wherein at least one of the first and second encoders further receive a non-audio measurement signal that is used together with the audio input signal to extract the current features, and wherein the respective at least one first and second recurrent neural networks are trained to jointly perform sound enhancement and feedback cancellation using the audio measurement signal together with the non-audio input signal. Example 26 includes the hearing assistance device of example 25, wherein the non-audio measurement signal comprises at least one of an inertial measurement unit signal, a heart rate signal, and a blood oxygen level signal.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term “exactly” or “about.” Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms “up to” or “no greater than” a number (e.g., up to 50) includes the number (e.g., 50), and the term “no less than” a number (e.g., no less than 5) includes the number (e.g., 5).

The terms “coupled” or “connected” refer to elements being attached to each other either directly (in direct contact with each other) or indirectly (having one or more elements between and attaching the two elements). Either term may be modified by “operatively” and “operably,” which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as “top,” “bottom,” “side,” and “end,” are used to describe relative positions of components and are not meant to limit the orientation of the embodiments contemplated. For example, an embodiment described as having a “top” and “bottom” also encompasses embodiments thereof rotated in various directions unless the content clearly dictates otherwise.

Reference to “one embodiment,” “an embodiment,” “certain embodiments,” or “some embodiments,” etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A method for configuring an audio processor for a hearing device, the method comprising:

- providing a data set comprising: a reference audio signal; a simulated input comprising the reference audio signal combined with additive background noise; and a feedback path response;
- connecting a deep neural network between the simulated input and a simulated output of the hearing device, the deep neural network operable to change a response affecting the simulated output;
- training the deep neural network by applying the simulated input to the deep neural network while applying the feedback path response between the simulated input and the simulated output, the deep-neural network trained to reduce an error between the simulated output and the reference audio signal; and
- using the trained deep neural network for audio processing in the hearing device.

2. The method of claim 1, wherein the feedback path response varies as a function of time during the training.

3. The method of claim 1, wherein the deep neural network comprises a recurrent neural network within a cell that processes audio at discrete times in a sequence.

4. The method of claim 3, wherein the cell comprises:

- an encoder that extracts current features from a current audio input at a current time step, the current audio input comprising the simulated input at the current time step;
- the recurrent neural network coupled to receive the current features and enhance the current features with respect to previous enhanced features extracted from a previous time step; and
- a decoder that synthesizes a current audio output from the enhanced current features, the current audio output forming the simulated output.

5. The method of claim 4, wherein training the neural network comprises coupling a feedback module to the cell, the feedback module producing a current feedback component from a previous audio output based on the feedback path response, the current feedback component being combined with the current audio input.

6. The method of claim 1, wherein the data set further comprises a non-audio measurement signal, and wherein training the deep neural network further comprises applying the non-audio measurement signal together with the input signal to the simulated input while applying the feedback path response between the simulated input and the simulated output.

7. The method of claim 6, wherein the non-audio measurement signal comprises at least one of an inertial measurement unit signal, a heart rate signal, and a blood oxygen level signal.

8. The method of claim 1, wherein a parametric feedback controller is coupled to an output of the deep neural network and parameters of the parametric feedback controller are jointly optimized with the deep neural network during the training of the deep neural network, the jointly optimized parametric feedback controller used together with the trained deep neural network for the audio processing in the hearing device.

9. The method of claim 8, wherein the feedback parametric controller comprises a recurrent unit that is trained to determine an adaptive filter step size during the training of the deep neural network.

10. The method of claim 1, wherein training the deep neural network further comprises inserting a gain in the simulated output, the gain varying across frequency bands, a magnitude of the gain being gradually increased during the training to induce feedback via the feedback path response.

11. The method of claim 10, wherein the magnitude of the gain varies from a lower value to a higher value, the lower value comprising a maximum stable gain of the hearing device plus an offset, the higher value being greater than the lower value and incremented in training to increase an amount of the feedback without causing instability during a beginning of the training.

12. A hearing assistance device comprising a memory that stores the trained deep neural network obtained using the method of claim 1, the hearing assistance device using the trained neural network for operational audio processing.

13. A hearing assistance device, comprising:

- an input processing path that receives an audio input signal from a microphone;
- an output processing path that provides an audio output signal to a loudspeaker; and
- a processing cell coupled between the input processing path and the output processing path, the processing cell comprising:
  - an encoder that extracts current features at a current time step from the audio input signal;
  - a recurrent neural network coupled to receive the current features and enhance the current features with respect to previous enhanced features extracted from a previous time step, the recurrent neural network trained to jointly perform sound enhancement and feedback cancellation; and
  - a decoder that synthesizes a current audio output from the enhanced current features, the current audio output forming the audio output signal.

14. The hearing assistance device of claim 13, wherein the encoder further receives a non-audio measurement signal that is used together with the audio input signal to extract the current features, and wherein the recurrent neural network is trained to jointly perform the sound enhancement and the feedback cancellation using the audio measurement signal together with the non-audio input signal.

15. The hearing assistance device of claim 14, wherein the non-audio measurement signal comprises at least one of an inertial measurement unit signal, a heart rate signal, and a blood oxygen level signal.

16. The hearing assistance device of claim 13, further comprising a parametric feedback controller coupled to the decoder, parameters of the parametric feedback controller being jointly optimized with the recurrent neural network during training of the recurrent neural network, the jointly optimized parametric feedback controller used together with the recurrent neural network for audio processing in the hearing assistance device.

17. The hearing assistance device of claim 16, wherein the feedback parametric controller comprises a recurrent unit that is trained to determine an adaptive filter step size during the training of the recurrent neural network.

18. A hearing assistance device, comprising:

an input processing path that receives an audio input signal from a microphone;

an output processing path that provides an audio output signal to a loudspeaker; and a processing cell coupled between the input processing path and the output processing path, the processing cell comprising:

a first encoder that extracts first current features at a current time step from the audio input signal;

a first recurrent neural network coupled to receive the first current features and enhance the first current features with respect to first previous enhanced features extracted from a previous time step;

a first decoder that synthesizes a current audio output from the enhanced first current features, the current audio output forming the audio output signal;

a second encoder that extracts second current features from a combination of the current audio input and the current audio output;

a second recurrent neural network that receives the second current features and enhances the second current features with respect to second previous enhanced features extracted from the previous time step; and a second decoder that synthesizes a feedback cancellation output from the enhanced second current features, the feedback cancellation output being subtracted from the audio output signal, wherein the first and second recurrent neural networks are trained to jointly perform sound enhancement and feedback cancellation.

19. The hearing assistance device of claim 18, wherein at least one of the first and second encoders further receive a non-audio measurement signal that is used together with the audio input signal to extract the current features, and wherein the first and second recurrent neural networks are trained to jointly perform the sound enhancement and the feedback cancellation using the audio measurement signal together with the non-audio input signal.

20. The hearing assistance device of claim 19, wherein the non-audio measurement signal comprises at least one of an inertial measurement unit signal, a heart rate signal, and a blood oxygen level signal.

* * * * *